J. W. CURRAN.
ARCH BAR TRUCK.
APPLICATION FILED NOV. 10, 1920.
1,370,519.
Patented Mar. 8, 1921.
2 SHEETS—SHEET 2.
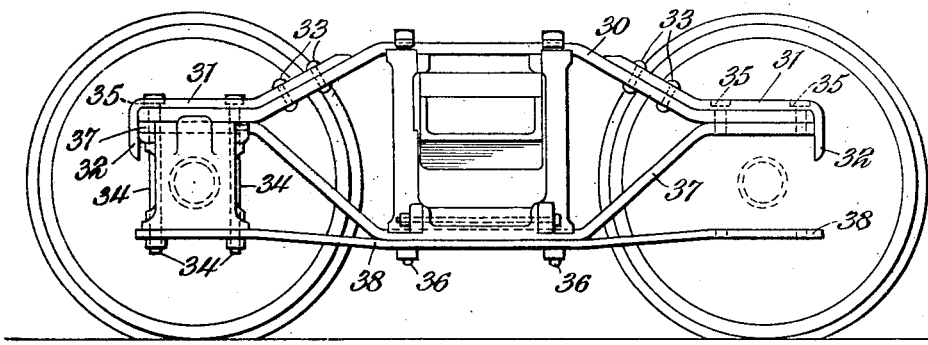
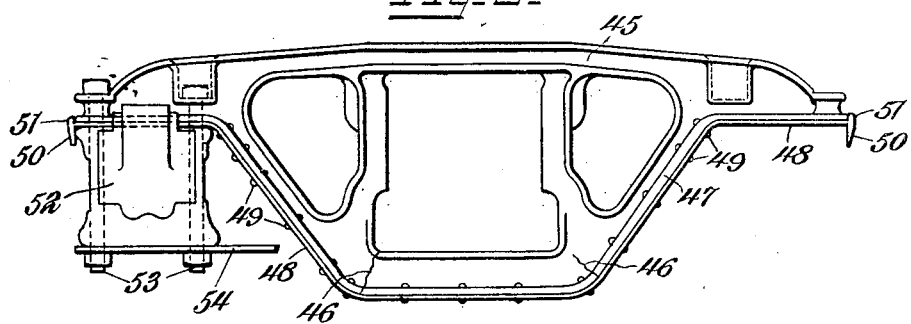
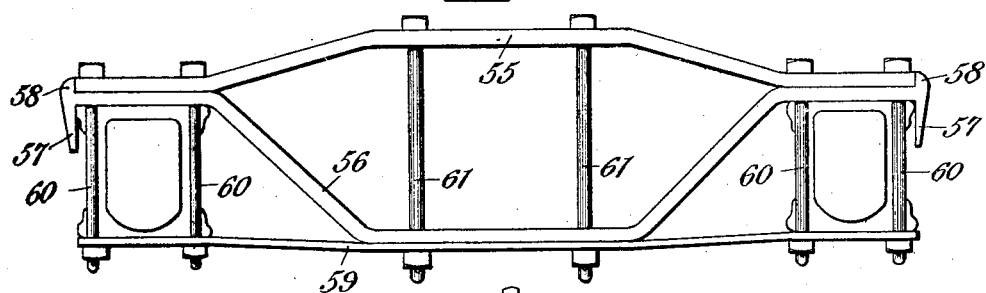
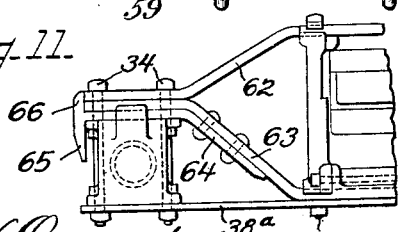
J. W. Curran
INVENTOR
WITNESSES
BY
ATTORNEY

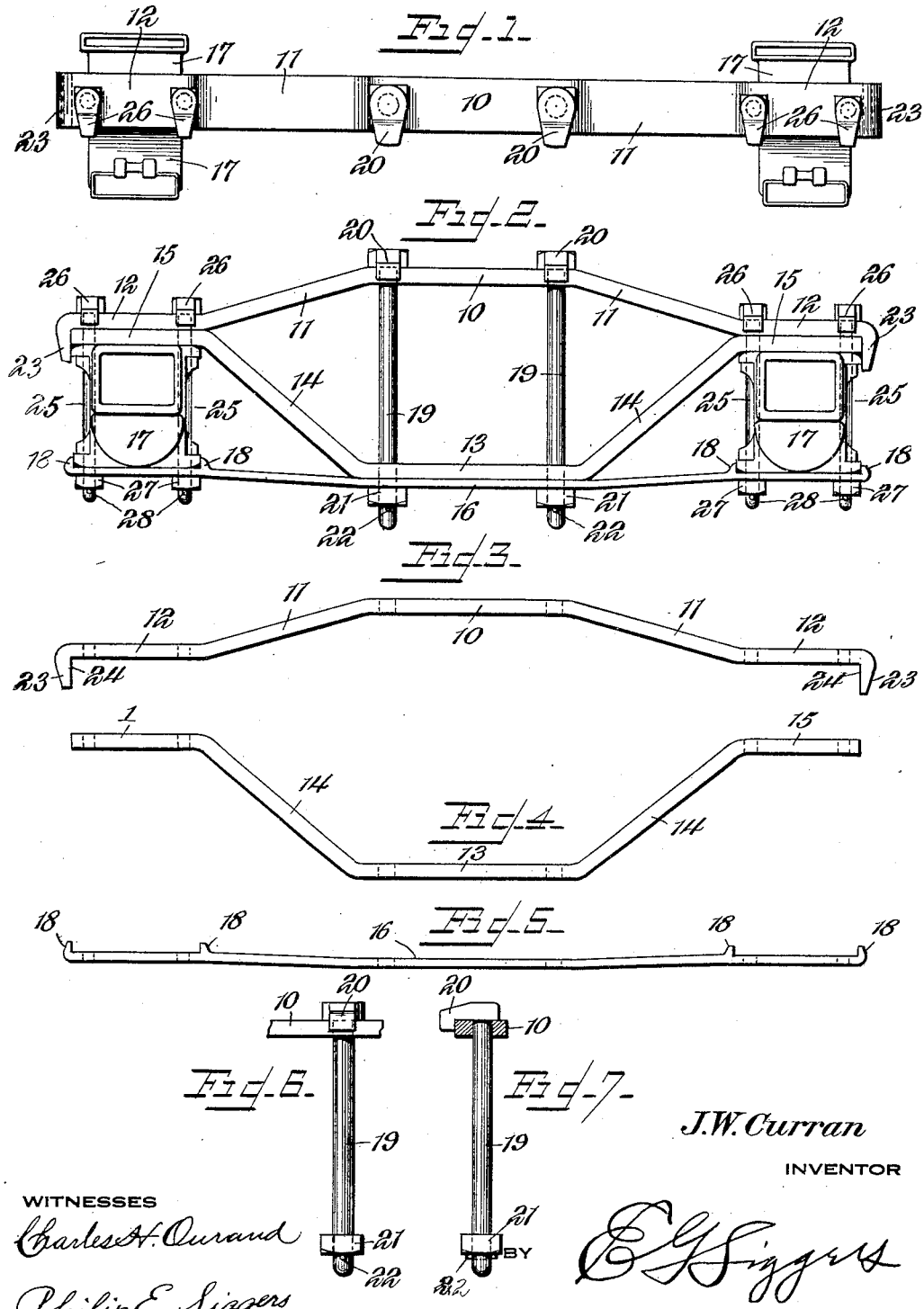

UNITED STATES PATENT OFFICE.

JOHN W. CURRAN, OF NEWPORT, KENTUCKY.

ARCH-BAR TRUCK.

1,370,519.  Specification of Letters Patent.  Patented Mar. 8, 1921.

Continuation of application Serial No. 398,080, filed July 22, 1920. This application filed November 10, 1920. Serial No. 423,036.

*To all whom it may concern:*

Be it known that I, JOHN W. CURRAN, a citizen of the United States, residing at Newport, in the county of Campbell and State of Kentucky, have invented new and useful Improvements in Arch-Bar Trucks, of which the following is a specification.

This invention relates to a novel construction of arch bar trucks for use on railroad freight cars.

Railroads throughout the country are having numerous wrecks and derailments resulting from the severe hammer blows administered to the trucks by the air brakes when applied under very heavy pressure, particularly when applied in an emergency. The brakes are hung inside the wheels and when applied push outwardly longitudinally with the car and truck. This shock is absorbed by the eight bolts for the four oil boxes and by the four column bolts in the center.

As the result of the many applications of air brakes, many hundreds of tons of dead weight being brought to a stop many times in the course of a day, the entire structure of the truck is loosened and the shock and chafing wear the bolts and eventually shear them off or break the arch bars or tie bars, resulting in serious accidents and frequently in wrecks.

The general objects of the present invention are to relieve the stress on the bolts to a large extent and transmit it to the arch bars, tie straps and oil boxes, and to tighten up the truck and make the parts more rigid so they will perform their functions in absorbing the load shock as well as the brake shock, to eliminate liability of derailment and wrecks, thus saving railroads the enormous expense incident thereto.

A further object of the invention is to provide a truck whose construction meets with the requirements of both the Government and of the Master Car Builders' Association and which is interchangeable with the standard trucks approved by them.

An additional object of the invention is to provide an arch tie bar adapted particularly to be used with broken steel truck side frames so as to make unnecessary the salvaging of such frames.

In one form of the present invention, the top arch bar has end flanges which fit about the ends of the inverted or bottom arch bar and also fit against the outside of the oil boxes. The tie bar has two lips turned upwardly at the ends fitting against one side of the oil boxes and two additional upturned lips fitting against the other side of the same. The journal box or oil box bolts, as well as the column bolts, have peculiarly shaped heads which hook over one edge of the top arch bar, thus preventing the bolts from turning with consequent loss of the nuts and loosening of the entire truck structure.

The invention will be best understood from a consideration of the following detailed description taken in connection with the accompanying drawing forming part of this specification, with the understanding, however, that the invention is not confined to any strict conformity with the showing in the drawing, but may be changed and modified so long as such changes and modifications mark no material departure from the salient features of the invention as expressed in the appended claims.

In the drawing:

Figure 1 is a top plan view of so much of a truck as is necessary for the understanding of the present invention.

Fig. 2 is an elevation thereof.

Fig. 3 is a detail of the top arch bar.

Fig. 4 shows the bottom arch bar.

Fig. 5 shows the tie bar.

Fig. 6 is an elevation of one of the column bolts showing its connection with the top arch bar.

Fig. 7 is a side view of the parts shown in Fig. 6.

Fig. 8 is an elevation showing a car truck with a slightly modified form of top arch bar.

Fig. 9 is an elevation showing a broken truck side frame which has been repaired by using an arch bar made in accordance with the principles of the present invention.

Fig. 10 is an elevation showing a further modified form of the invention.

Fig. 11 is a fragmentary elevation of a still further modification.

The numeral 10 designates the central section of the top arch bar, which section is straight and disposed horizontally. The top arch bar has inclined sections 11 and end sections 12. The end sections each have a down-turned flange 23 integral therewith.

At suitable intervals the top arch bar is bored to receive the column bolts 19 and oil box bolts 25.

The bottom arch bar has a central horizontal section 13 and upwardly inclining sections 14 terminating in straight end sections 15. The end sections 12 and 15 are of the same length and when the parts are assembled are in juxtaposition, being held together with the end section 12 immediately above the end section 15. The extremities of the end sections 15 are fitted between the flanges 23, whose inner flat faces 24 extend at right angles to the end sections 12. The bottom arch bar is also suitably bored to receive the same bolts 19, 25 which pass through the upper arch bar. The bottom arch bar is here described as a well known construction and forms no part of the present invention.

Journal boxes or oil boxes 17 are fitted against the undersides of the end sections 15. The flanges 23 bear against the side of the oil boxes to prevent any tendency on the part of the oil boxes to slip and chafe on the bottom arch bar or the bolts 25 which hold them in place. Thus the possibility of the shearing off of the box bolts is reduced to a minimum.

To the underside of the intermediate section 13 of the bottom arch bar a tire bar 16 is secured by ends of the column bolts 19. The tie bar is suitably bored to receive these bolts as well as the ends of the box bolts 25. The tie bar supports the oil boxes 17 in conjunction with the box bolts 25. To further hold the oil boxes in proper position the tie bar has a plurality of upturned lips 18, there being one lip fitting against one side of each oil box and a second lip fitting against the other side thereof.

In order to prevent any possibility of any of the bolts 19, 25 turning in the bores provided in the arch bars and tie bar, the head of each column bolt 19 has an outwardly and downwardly turned extension which hooks over one edge of the top arch bar. This extension is integral with the head of the bolt, and when the nuts 21 on the opposite end of the bolt are secured home, there is no possibility of the bolts turning, and therefore no possibility of the nuts becoming loosened. As a further precaution, a cotter pin or similar element 22 may be passed through the end of the bolt outside of nut 21 to form a nutlock. The bolts 25 have extensions 26 on their heads exactly like the extensions 20, so that their nuts 27 will not become loosened. Cotter pins or equivalent elements 28 may be provided for the bolts 25 also. The nuts can be applied and removed by one man instead of two, as at present. When the trucks are taken apart, instead of burning off the nuts, they can be used over again.

In the construction of Fig. 8, the top arch bar 30 does not have depending end flanges integral therewith, but instead has a bar 31 united thereto by means of rivets, bolts or the like 33. There are two bars 31 secured to the end portions of the top arch bar 30. Each bar 31 has an integral, depending end flange 32, which extends down alongside the adjacent oil box to hold the same to the truck. It will be understood that since the two bars 31 are united to the top arch bar they form, for all practical purposes, a continuation thereof. By the use of bars similar to bars 31, it will be seen that car trucks of an old and well known construction may be modified in accordance with the principles of the present invention. The top arch bar 30 and the two bars 31 form, for all practical purposes, a single arch bar, the full equivalent of the top arch bar 10. A bottom arch bar 37 is employed whose ends are interposed between the end flanges 32 as in the earlier described construction. A tie bar 38 is also employed but in this case no upstanding lips are provided on the tie bar. Oil box bolts 34 unite the upper and lower arch bars and the tie bar to the oil boxes, the heads of said bolts being received within sockets 35, provided in the auxiliary bars 31. Column bolts 36 complete the truck frame.

Fig. 9 illustrates a truck side frame 45, which is broken along the lines 46. Such a frame may be made practically as useful as it ever was, by welding the breaks or fractures 46 and then riveting an arch bar 48 to the lower flange 47 of the frame. The rivets or similar fastening elements are indicated at 49. The arch bar 48, has depending end flanges 50 which are adapted to extend down alongside the oil boxes 52. An upstanding lip 51 is also provided at each end of the arch bar 48 which fit against the ends of the side frame. Oil box bolts 53 unite the frame 45 with the oil boxes 52 and the tie bar 54 is secured to the under side of the two oil boxes by said bolts.

In the construction of Fig. 10 the top arch bar 25 does not have depending end flanges. It is the bottom arch bar 56 which has depending end flanges 57 for holding the oil boxes. Upstanding lips 58 are also provided at the ends of the bottom arch bar 56, which lips receive between them the top arch bar 55. Oil box bolts 60 pass through the two arch bars and alongside the oil boxes, as well as through the tie bar 59. Column bolts 61 complete the structure.

In the construction depicted in Fig. 11, the tie bar 38ᵃ is similar to bars 38 and 59. The upper arch bar 62 has an ordinary end as has also the lower arch bar 63. An auxiliary bar 64 is united to each end of the lower arch bar underneath the same and extends beyond the extremity of the arch bar. There it is provided with a depending end flange 65 to hold the oil box against displacement. There is also an integral upturned lip 66 which abuts the end of the upper arch bar. The oil box bolts 34 pass through bars 62, 63, 64 and 38ª, to hold the parts together. This construction bears approximately the same relation to Fig. 10 as Fig. 8 does to Fig. 2.

Among the features of the present invention are the following: The brake shock effect is reduced to a minimum and distributed to the entire truck so that the shock absorbed by the bolts in the present truck constructtion is largely eliminated. However, should any of the bolts become broken the truck will not break down. Stretching or elongation of the metal parts under the strain of the application of the brake, which stretching frequently breaks the arch bars and truck sides, is reduced to a minimum. The lips and flanges absorb the shock induced by the hammer blow of the brake, entirely preventing shearing off of any of the bolts. Sagging of the arch and consequent striking of the crossing planks or cross-switch rails at railroad crossings by the column bolts is prevented, tilting of the journal boxes is eliminated, the wear of the journal bearings as well as of the wheels is reduced, as well as the liability of hot boxes and costly repairs. The trucks stand squarely on their wheels and will stay in this desired position because of the provision of the flanges and lips as described. One bolt may be removed from each journal box on the present truck and the car could run indefinitely. Even if all the journal box bolts were removed, the car would run in perfect safety for hundreds of miles, the lips and flanges holding the wheels intact until the car reached an inspection point.

It will be observed that in all forms of the invention, either the top arch bar or the bottom arch bar is provided with extensions, flanges or prolongations, the purpose of which is to prevent relative movement of the arch bars as well as to hold the oil boxes from displacement.

This application is a continuation, so far as Figs. 1 to 7, inclusive, are concerned, of application No. 398,080, filed July 22, 1920.

What is claimed is:—

1. In a railway car truck, means for securing the oil boxes including an arch bar, and bolts uniting the bar at each end to the oil boxes, said arch bar having a depending flange at each end extending alongside the outer face of the oil box whereby said boxes are held to the truck.

2. In an arch bar truck, a top arch bar, downwardly extending flanges provided at each end of the top arch bar, a bottom arch bar fitting at its ends between said flanges which depend below the ends of said bottom arch bar, column bolts holding the two arch bars together, a tie bar secured to the bottom arch bar below the same by means of the column bolts, and oil boxes mounted between the ends of the tie bar and the ends of the bottom arch bar in such position that the end flanges of the top arch bar engage with the outer sides of the boxes.

3. In an arch bar truck, a top arch bar having depending end flanges with the inner faces of said flanges plane and at right angles to the adjacent sections of the top arch bar, a bottom arch bar mounted with its ends abutted against the said inner faces of the flanges, a tie bar mounted beneath the bottom arch bar, lips on the upper face of the tie bar, oil boxes mounted between the tie bar lips and between the tie bar and the bottom arch bar, said end flanges depending below the ends of said bottom arch bar engaging the outside upper portions of the corresponding oil boxes, column bolts uniting the two arch bars and the tie bar centrally of the truck, and other bolts on each side of the oil boxes and uniting the arch bars, tie bar and oil boxes, each of said bolts having a head shaped to engage with one of the side edges of the top arch bar to prevent turning of said bolts.

4. In an arch bar truck, a top arch bar having depending end flanges with the inner faces of said flanges plane and at right angles to the adjacent sections of the top arch bar, a bottom arch bar mounted with its ends abutted against the said inner faces of the flanges, a tie bar mounted beneath the bottom arch bar, lips on the upper face of the tie bar, oil boxes mounted between the tie bar lips and between the tie bar and the bottom arch bar, said end flanges depending below the ends of said bottom arch bar and engaging the outside upper portions of the corresponding oil boxes, column bolts uniting the two arch bars and the tie bar centrally of the truck, and other bolts on each side of the oil boxes and uniting the arch bars, tie bar and oil boxes.

5. In a railway car truck employing a top arch bar, a bottom arch bar, a tie bar, column bolts, and oil boxes, the combination therewith of a flange provided on one of said arch bars, said flange extending alongside the outer face of the oil box for the purpose set forth.

6. In a railway car truck employing a top arch bar, a bottom arch bar, a tie bar, column bolts, and oil boxes, the combination therewith of means provided at the end of one of said arch bars to prevent relative movement of said bars and also to hold the oil box from displacement.

In testimony that I claim the foregoing as my own I have hereto affixed my signature.

JOHN W. CURRAN.